(12) United States Patent
Gaukroger

(10) Patent No.: US 11,279,807 B2
(45) Date of Patent: Mar. 22, 2022

(54) MASTERBATCH FOR PVC

(71) Applicant: Colour Tone Masterbatch Limited, Bedwas (GB)

(72) Inventor: Anthony Gaukroger, Bedwas (GB)

(73) Assignee: Colour Tone Masterbatch Limited, Bedwas (GB)

( * ) Notice: Subject to any disclaimer, the term of this patent is extended or adjusted under 35 U.S.C. 154(b) by 153 days.

(21) Appl. No.: 16/075,336

(22) PCT Filed: Feb. 2, 2017

(86) PCT No.: PCT/GB2017/050256
§ 371 (c)(1),
(2) Date: Aug. 3, 2018

(87) PCT Pub. No.: WO2017/134439
PCT Pub. Date: Aug. 10, 2017

(65) Prior Publication Data
US 2019/0040210 A1 Feb. 7, 2019

(30) Foreign Application Priority Data
Feb. 3, 2016 (GB) ...................... 1601896

(51) Int. Cl.
| | | |
|---|---|---|
| C08L 23/28 | (2006.01) | |
| C08L 27/06 | (2006.01) | |
| C08J 3/22 | (2006.01) | |
| C08K 3/013 | (2018.01) | |
| C08K 5/098 | (2006.01) | |

(52) U.S. Cl.
CPC ............. *C08J 3/226* (2013.01); *C08K 3/013* (2018.01); *C08K 5/098* (2013.01); *C08L 23/286* (2013.01); *C08L 27/06* (2013.01); *C08J 2327/06* (2013.01); *C08J 2423/28* (2013.01); *C08L 2205/02* (2013.01); *C08L 2205/03* (2013.01); *C08L 2205/035* (2013.01); *C08L 2310/00* (2013.01)

(58) Field of Classification Search
CPC .... C08J 3/226; C08J 2423/28; C08J 2327/06; C08L 27/06; C08L 23/286; C08L 2205/035; C08L 2310/00; C08L 2205/03; C08L 2205/02; C08K 5/098; C08K 3/013
See application file for complete search history.

(56) References Cited

U.S. PATENT DOCUMENTS

| | | | | |
|---|---|---|---|---|
| 5,589,531 | A  * | 12/1996 | Menashi ................... | C08J 3/203 524/409 |
| 8,969,435 | B2 * | 3/2015 | Wright .................. | B29C 41/042 523/223 |
| 2004/0192849 | A1 * | 9/2004 | Gaukroger ............... | C08J 3/226 525/213 |
| 2015/0225557 | A1 * | 8/2015 | Habimana ............... | C08L 23/12 523/351 |

FOREIGN PATENT DOCUMENTS

| | | | |
|---|---|---|---|
| CN | 104530589 A | 4/2015 | |
| EP | 0779341 A1 | 6/1997 | |
| EP | 1421136 B1 | 5/2009 | |
| GB | 2379221 A | 3/2003 | |
| JP | S62109854 A | 5/1987 | |
| JP | H11-279221 * | 10/1999 | ............. C08F 10/02 |
| WO | 2015014897 A1 | 2/2015 | |

OTHER PUBLICATIONS

Misumi et al., machine English translation of JP H11-279221 (Year: 1999).*

* cited by examiner

*Primary Examiner* — Jessica M Roswell
(74) *Attorney, Agent, or Firm* — Dinsmore & Shohl LLP

(57) ABSTRACT

The present invention relates to improvements in a masterbatch which is a compounded concentrated mixture of colorants and/or additives to effect the properties, typically the color, of a target polymer. One aspect of the present invention comprises a polyvinyl chloride (PVC) masterbatch comprising a chlorinated polyolefin having a melt flow index (MFI) characteristic of between 1 and 30 having units of g/10 min at a temperature of 180° C. at a weight of 10 kg; an acrylic processing aid and/or acrylic impact modifier and/or acrylic moulding powder; and at least one dye, pigment and/or functional additive.

20 Claims, No Drawings

MASTERBATCH FOR PVC

CROSS-REFERENCE TO RELATED APPLICATIONS

This application is the U.S. national stage of PCT/GB2017/050256 filed Feb. 2, 2017, which claims priority of United Kingdom patent application GB 1601896.2 filed Feb. 3, 2016 of which is hereby incorporated by reference in its entirety.

FIELD OF INVENTION

The present invention relates to improvements in a masterbatch and in particular relates to a multipurpose masterbatch carrier and a masterbatch itself including the carrier. A masterbatch is a compounded concentrated mixture of colourants and/or additives to affect the properties, typically colour, of a target polymer.

BACKGROUND OF INVENTION

In order to provide coloured thermoplastics it is known to colour a base thermoplastic of typically neutral colour through the use of pigment packs and/or liquid colour concentrates, or by using dry, typically colourized, coloured colour concentrates. These compounded colour concentrates are known in the plastics industry as a masterbatch. The alternative way of colouring a base thermoplastic is to supply thermoplastic material pre-coloured, however there is little flexibility associated with this approach for changing colours and/or properties, and the cost is typically higher.

Masterbatch is provided in a granulated form which is then added to the thermoplastic material just before processing to form the desired product. The granular masterbatch typically has a generally spherical or cylindrical form. In cylindrical form the diameter is approximately between 2.5 mm and approximately 2.6 mm in length. EP 1421136 describes a masterbatch, masterbatch carrier and method of producing both masterbatch carrier and masterbatch itself, the masterbatch of granular form and being suitable for PVC processing.

It is desirable for manufacturers of PVC and preferably PVCu products for, for example, building, rainwater and cladding profiles, PVCu decking materials and PVCu sheet for packaging applications to be able to produce products of their chosen colour in situ. For the reasons of costs manufacturers do not purchase pre-compounded colour PVC but instead mix their own free flowing powder blend in a high speed dry blender. This mixture is then compounded and melt processed in one operation when making their end product. For this process, masterbatch provided in a granulated form is undesirable and if used the result is possibility of separation in the dry powder blend and poor wetting out properties in the host polymer. As such, it is desirable for a small particle format colloquially known as "prill". This small particle format is preferred by processers in these applications who introduce the prill into the polymer feed immediately before melt processing. The prill is less likely to separate in a powder blend than a traditional granule. Being small these particles have improved distributive mixing and hence wet out extremely easily and quickly in the host polymer. These superior characteristics can result in being able to use stronger concentrates with less chance of streaking and poor dispersion that might occur with a traditional larger granule.

Although it is desirable to make a prill masterbatch supplied in a format suitable to be mixed with PVC in any form, either in the form of dry blended powder or compounded granule, this is difficult. The masterbatch produced as described in EP1421136 for example provides poor capability in the provision of a dry blended application, as difference in particle sizes and shape means the granules which are cylindrical can intentionally separate out. Furthermore, the resultant product is required to remain free flowing after cooling and not ball up (clump) when packed on pallets. The masterbatch as described in EP1421136 is not capable in this regard.

In attempting to produce a masterbatch suitable for PVC, suitable processing machinery is a high shear, melt mixing, processing machine using twin screw extruders for example. The extruders are fitted with a micro pellet die and an underwater, die face cutter. Although this machinery is designed to produce micro pellets/prill the demands on the material formulation to make a masterbatch suitable to colour or modify PVC that can be processed to produce prill of this type is particularly difficult. The material must withstand the extreme mixing, temperature and pressure that processing in this manner generates. The molten masterbatch must then be able to flow through die holes of between 1 mm and 2.6 mm, typically 1.2-1.8 mm, and withstand the frictional forces and localised heating that is usual with this process. The prill must then be capable of being rapidly cooled and dried and not prone to post processing clumping. The effect of using a masterbatch composition as described in EP1421136 to produce a prill using such processing apparatus is that the die holes become immediately blocked. This is due to a phenomenon known as "freeze off". This occurs as the material formation leaves the end of the screw of the extruder and before entering the die. Some cooling occurs at this point meaning the material formulation effectively sticks to the distal end of the screw. Heat and pressure is traditionally applied as the material formulation does not have good flow characteristics, and further pushing through small die holes compounds this issue.

SUMMARY OF INVENTION

The present invention provides a masterbatch (and masterbatch carrier) that is capable of being produced into a micro pellet/prill pellet size that is thus suitable for mixing with a dry blend PVC for subsequent compounding and melt processing in a single operation to make an end product.

DETAILED DESCRIPTION OF INVENTION

According to an aspect of the present invention there is a polyvinylchloride (PVC) masterbatch comprising:
  a chlorinated polyolefin having a melt flow index (MFI) characteristic of between 1 and 30 having units of g/10 min at a temperature of 180° C. at a weight of 10 kg;
  an acrylic processing aid and/or acrylic impact modifier and/or acrylic moulding powder;
  at least one dye, pigment and/or functional additive.

The applicant has realised that change in the masterbatch ingredients has given the result of providing the capability of producing a micro pellet/prill pellet size that may be utilised by PVC manufacturers to mix with their own (free flowing) powder blend in a high speed dry blender ready for subsequent compounding and melt processing in a single operation. This saves significant time and expense in PVC manufacturing. The propensity for freeze off in production of the prill is much reduced and the pressure can be reduced due to the improved flow characteristics. Known masterbatch compositions have relatively poor flow characteristics meaning utilising the present invention reduces processing costs as the pressure can be reduced to cause the composition to flow through the die holes. It has further been determined that processing the masterbatch of the present invention using die face cutting apparatus enables production of substantially circular rather than expected cylindrical prill shape. As the masterbatch passes through the die and is cut the prill changes in shape as it cools. Initially after passing through the die hole there is slight expansion followed by a shape chase from cylindrical to more spherical. This provides prill that is less susceptible to separation from PVC when mixed, and also reduces the clumping effect.

Typical prill size is between 1.2-2 mm diameter produced using a die hole diameter of between 1.2-1.8 mm due to swelling of the prill after passing through the die hole.

Chlorinated polyolefins are well known in masterbatch production however it has been found that utilising a chlorinated polyolefin having a melt flow index (MFI) characteristic valve between one and thirty results in the capability (in cooperation with other ingredients) to produce a micro pellet or prill pellet. The effect of such an MFI characteristic is to change the chlorinated polyolefin typically utilised for production of a masterbatch from having elastic rheological tendencies to the provision of plastic rheological tendencies. The inclusion of such a chlorinated polyolefin may have substantially similar or the same properties to a chlorinated polyolefin used in the art where, for example, chlorine content, shore hardness, tensile strength and elongation at break are substantially the same. Suitable properties are presented in Table 1 below. They are compared to polyolefin traditionally used in masterbatch production presented in Table 2.

TABLE 1

| Item | Unit | Index |
| --- | --- | --- |
| Chlorine content | % | 35 ± 1 |
| Fusion heat | J/g | ≤7.5 |
| Flow velocity (10 kg 180° C.) | g/10 min | 6~13 |
| Volatile matter content | % | ≤0.3 |
| Shore hardness | Shore A | ≤60 |
| Tensile strength | MPa | ≥8.0 |
| Break elongation | % | ≥800 |

TABLE 2

| Item | Unit | Index |
| --- | --- | --- |
| Chlorine content | % | 35 ± 1 |
| Thermal decomposition temperature | ° C. | ≥165 |
| Volatile matter content | % | ≤0.3 |
| Residual crystallinity | % | ≤2 |
| Mooney viscosity | ML 121° C.1 + 4 | 65 ± 5 |
| Shore hardness | Shore A | ≤56 |
| Tensile strength | MPa | ≥8.5 |
| Break elongation | % | ≥700 |

It is further beneficial that the MFI characteristic is between 5 and 20.

It will be appreciated that chlorinated polyolefin is generally used as an impact modifier.

The effect of the this modification upon the properties of the MFI characteristic is to change the properties of the masterbatch and the rheological tendencies from elastic to plastic enabling improved melt flow capability. It will be appreciated that melt flow is a measure of the ease of flow of the melt of a thermoplastic polymer, and is defined as the mass of polymer in grams flowing in 10 minutes through a capillary of a specific diameter and length by a pressure applied via prescribed alternative gravimetric weights for alternative prescribed temperatures. The temperature and weight as described in Table 1 is taken at 180° C. with a weight of 10 kg.

The chlorinated polyolefin is beneficially a chlorinated polyolefin resin. The chlorinated polyolefin is beneficially chlorinated polyethylene, however the chlorinated polyolefin may alternatively be chlorinated polyethylene. The chlorine content is approximately 35 weight %, Shore hardness is approximately greater than 60 A, tensile strength is greater or equal to 8 MPa and break elongation is greater than or equal to 800%.

Chlorinated polyolefin is beneficially present in an amount of between 10 and 40 weight % of the masterbatch. Beneficially, the chlorinated polyolefin is present in between 15 and 36 weight % of the masterbatch. Even more beneficially, the chlorinated polyolefin is present in an amount of 17 to 34 weight % of the masterbatch. This is dependent upon the desired properties and in particular desired colour effect to be imparted on PVC by the masterbatch.

The acrylic processing aid is beneficially provided to improve processing characteristics on the way from the raw material to the semi-finished and finished article. Such acrylic processing aid may accelerate melting processing, improve the rheological properties in the thermoplastic state and beneficially improve the mechanical properties in the thermo elastic state. The provision of an acrylic processing aid is therefore preferred and is preferably provided as less than 10 weight % of the masterbatch. In some masterbatches according to the present invention an acrylic processing aid may not be present at all. Preferred acrylic processing aids include methyl-methacrylate based processing aids however other suitable acrylic processing aids may be included. Known processing aids commercially available include, for example, acrylic processing aid P270.

It is beneficial that the masterbatch includes an acrylic impact modifier however for certain masterbatch compositions it is not essential. The acrylic impact modifier is beneficially an acrylic/styrene polymer. A preferred impact modifier includes Paraloid D320®. It will be appreciated by the skilled addressee that alternative acrylic impact modifiers may be utilised. The provision of an acrylic impact modifier is advantageous for reasons known in the art. The advantages include trouble free processing, resistance to light and weathering, high impact strength, good surface formation and high aging resistance. The acrylic impact modifier is beneficially provided up to approximately 20 weight % of the masterbatch. Even more beneficially, the acrylic impact modifier is provided as approximately 10 weight % of the masterbatch.

The masterbatch preferably includes an acrylic moulding powder. The acrylic moulding powder acts in a similar manner to an impact modifier, but due to its molecular weight is less sticky meaning the product is less prone to clumping.

The acrylic moulding powder is beneficially provided in an amount of less than 25 weight % of the masterbatch and preferably the acrylic moulding pad is provided in an amount of between 5 and 25 weight % of the masterbatch. Even more preferably, the acrylic moulding powder is present in an amount of between 10 and 20 weight % of the masterbatch.

The dye and pigments are well known in the art. The functional additive is an additive beneficial to the properties of the end PVC product. Such functional additives may comprise UV stabilisers, anti-stats, flame retardants or the like.

The MFI characteristic is preferably between 5 and 20. This range provides an improved melt flow characteristics of the mixture in production of the masterbatch. One or more processing additives are beneficially included in the masterbatch. The one or more processing additives are beneficially selected from the group comprising a desiccant and/or lubricant. If present, the desiccant is beneficially present in an amount of between 3 and 6 weight % of the masterbatch. Even more preferably, the desiccant is present in the range of between 4 and 5 weight %. Even more preferably, the desiccant is present in an amount of approximately 5 weight % of the masterbatch. The desiccant is beneficially calcium oxide.

A lubricant is beneficially provided in the masterbatch for internal lubrication of the masterbatch mixture and/or external lubrication of the masterbatch mixture during processing as it passes through processing apparatus. The lubricant is beneficially a blend of a plurality of lubricant materials. A first lubricant material may be one or more wax types, and a second lubricant material may be calcium stearate. One or more wax types are beneficially provided and appropriate selection is made to beneficially provide internal and external lubrication of the masterbatch. Wax is beneficially provided in an amount of between 5 and 20 weight % of the masterbatch. Even more beneficially, wax is present in an amount of between 5 and 10 weight %. Calcium stearate is beneficially provided in a range of between approximately 2 weight % and 5 weight % of the masterbatch. Calcium stearate is beneficially utilised in the event of the use of inorganic pigments in the masterbatch.

The one or processing additives beneficially includes or comprises oil. Oil is preferably provided in an amount of between 0 and 3 weight % of the masterbatch. Oil is included as a dampening agent effectively reducing the "dustiness" of the masterbatch mixture.

The dye and/or pigment may be any standard dye/pigment used in the colouring of thermoplastics.

The masterbatch beneficially further comprises a filler. A filler is utilised to reduce the cost of the masterbatch. The filler may be present in the range of between 0 weight % and 50 weight % of the masterbatch. Preferably, the filler is present in the range of 0 to 40 weight % of the masterbatch. A suitable filler is barytes or challe.

The present invention also extends to a polyvinyl chloride (PVC) masterbatch carrier, comprising:
  a chlorinated polyolefin having a melt flow index (MFI) characteristic of between 1 and 30 having units of g/10 min at a temperature of 180° C. at a weight of 10 kg;
  an acrylic processing aid and/or acrylic impact modifier and/or acrylic moulding powder.

The carrier is preferably for use with dyes, pigments, functional additives or the like which may be added to the masterbatch when the masterbatch is being manufactured.

It will be appreciated that the term masterbatch has been utilised. An alternative definition of a masterbatch is an additive.

Also according to the present invention there is a method of manufacturing a masterbatch comprising the steps of:
  blending a chlorinated polyolefin having a melt flow index (MFI) characteristic of between 1 and 30 having units of g/10 min at a temperature of 180° C. at a weight of 10 kg and an acrylic processing aid and/or acrylic impact modifier and/or acrylic moulding powder and at least one dye, pigment and/or functional additive;
  forming the blend into a shaped body.

Also according to the present invention there is a method of manufacturing a masterbatch carrier comprising the steps of:
  blending a chlorinated polyolefin having a melt flow index (MFI) characteristic of between 1 and 30 and an acrylic processing aid and/or acrylic impact modifier and/or acrylic moulding powder;
  forming the blend into a shaped body.

The chlorinated polyolefin, acrylic processing aid, acrylic impact modifier, acrylic moulding powder and at least one dye, pigment, and/or functional additive are beneficially as described above.

The ingredients of the first step are initially carefully weighed.

The blending in the first step is then typically carried out in a high speed high shear mixer, such as a Henschel, a TK Fielder or a Papenmeir mixer. The temperature during this first step typically raises above ambient temperature. The elevated temperature is typically attained by frictional heat of the components of the blend. However, it is envisaged that a heating means may be utilised in order to increase the temperature if required. It is preferred that the temperature is controlled so as to remain substantially below about 80° C., preferably below about 70° C.

It is preferred that a process oil such as epoxidised soya bean oil is added during the first step. The addition of the process oil advantageously dampens the blend, thereby aiding fusion of the components in the first step and also assists in the formation of the shaped body in the second step by, for example, extrusion.

The blending is typically carried out at a temperature in the range of from ambient to about 80° C., such as 70° C.

The chlorinated polyolefin, the acrylic processing aid and/or the acrylic impact modifier and/or the acrylic moulding powder are all preferably free flowing powders, typically having a particle size of less than about 1200 μm (preferably less than about 700 μm) in diameter.

The additives (if present) and the die and/or pigment typically have a particle size of less than about 1200 μm in diameter, although it is envisaged that the particle size may be less than about 100 μm in diameter (or less).

Preferably the chlorinated polyolefin, and optionally the acrylic modifier and/or acrylic impact modifier and/or acrylic moulding powder and the process oil (if present) are preblended prior to the first step. The preblending may be in the same vessel used for the blending in the first step, however, it is envisaged that a different vessel may be used.

The preblending may be for up to about 1 minute, however, it is preferred that the preblending is for up to about 20 seconds.

The resultant blend of chlorinated polyolefin, acrylic processing aid and/or acrylic impact modifier and/or acrylic moulding powder and process oil (if present) achieved in the preblend is subsequently blended with the remaining components of the blend in the first step. The blend in the first step may be for up to about 30 minutes, preferably up to about 20 minutes.

The temperature achieved during the first step and/or the second step may be up to about 70 to 80° C. However, it will be apparent to a person skilled in the art that the temperature achieved and/or the blending time in the first step is dependent on the ingredients.

The forming in the second step is typically by extrusion, using for example a co-rotating twin screw extruder. The extrusion is preferably carried out on an extruder configured with at least two mixing zones and/or at least eight temperature zones.

The "prill" masterbatch may be made utilising "Leistritz" twin screw extruders but these are not the only suitable type of equipment. The extruder is fitted with a micro pellet die having suitable sized apertures for production of the necessary prill size and an underwater die faced cutter. The die holes are preferably in the range 1 mm to 2.6 mm even more preferably between 1.2-1.8 mm, and typically around 1.4 mm, and the molten masterbatch and composition thereof enables the withstanding of the extreme mixing temperature and pressure that processing in this manner generates. The molten masterbatch flowing through the die holes of this diameter with standard frictional force undergoes localised heating. A die face cutting apparatus cuts the extruded material as it exits the die. This creates an initial cylindrical particle of around 2 mm diameter and 3 mm length. Due to the cooling characteristics this shape changes to form a more spherical prill particle of between 1.2-2 mm diameter. These prill particles are taken away in a fluid flow and then spun dried.

Also according to the present invention there is a method of colouring PVC, in particular PVCu including blending a masterbatch manufactured according to the present invention with a base PVC material. The masterbatch is typically blended with the PVC material in a ratio in the range of 1:100 to 1:10 masterbatch to base PVC material.

The following are examples of masterbatch compositions according to the present invention. Each are presented as providing different colouring of a target PVC. Preferably, properties of PVCu may also be controlled dependent upon the application of the final product using an appropriate masterbatch according to the present invention.

Example 1

| INGREDIENT | WEIGHT % OF MASTERBATCH (PEARL) |
|---|---|
| PEARL 2000 (pigment) | 25 |
| BARYTES | 15 |
| CALCIUM OXIDE | 5 |
| CA STEARATE | 2.5 |
| PE WAX (1) | 5 |
| WAX (2) | 2.5 |
| WAX (3) | 2 |
| PARALOID P270 | 4.5 |
| PARALOID D320 | 9 |
| CHLORINATED POLYETHYLENE (CPE) | 27.5 |
| OIL | 2 |

Example 2

| INGREDIENT | WEIGHT % OF MASTERBATCH (GOLD) |
|---|---|
| ALUM PASTE (pigment) | 9.8 |
| ORANGE DYE 60 (pigment) | 19.6078 |
| BARYTES | 9.8039 |
| CALCIUM OXIDE | 4.902 |
| CA STEARATE | 3.9216 |
| WAX (1) | 1.9608 |
| WAX (2) | 1.9608 |
| WAX (3) | 3.9216 |
| PARALOID C303H | 9.8039 |
| PARALOID D320 | 9.8039 |
| CHLORINATED POLYETHYLENE (CPE) | 23.5294 |
| OIL | 0.9804 |

Example 3

| INGREDIENT | WEIGHT % OF MASTERBATCH (YELLOW) |
|---|---|
| TI02 PRIME | 14.84 |
| YELLOW DYE 72 | 5.09 |
| ORANGE DYE 60 | 0.41 |
| BARYTES | 19.66 |
| CALCIUM OXIDE | 5 |
| CA STEARATE | 4 |
| WAX OA2/H12 | 2 |
| WAX OP | 4 |
| PARALOID C303H | 10 |
| PARALOID D320 | 10 |
| CHLORINATED POLYETHYLENE (CPE) | 20 |
| EBA [G] | 4 |
| OIL | 1 |

Example 4

| INGREDIENT | WEIGHT % OF MASTERBATCH (WHITE) |
|---|---|
| TI02 VITA&EXT | 62 |
| VIOLET U/M 11 | 1.35 |
| BLUE U/M 08 | 0.15 |
| OPTICAL OB1/ECO | 2 |
| CALCIUM OXIDE | 2.5 |
| CA STEARATE | 2.5 |
| PE WAX | 3 |
| WAX OA2/H12 | 1.5 |
| ACRYLIC 20 [P] | 5.5 |
| CHLORINATED POLYETHYLENE (CPE) | 19 |
| OIL | 0.5 |

Example 5

| INGREDIENT | WEIGHT % OF MASTERBATCH (WHITE) |
|---|---|
| TI02 VITA&EXT | 60 |
| CA STEARATE | 2.5 |
| PE WAX | 5 |
| CALCIUM OXIDE | 5 |
| WAX OA2/H12 | 2 |
| ACRYLIC 20 [P] | 0 |
| PARALOID D320 | 8 |
| CHLORINATED POLYETHYLENE (CPE) | 17 |
| OIL | 1.5 |

Example 6

| INGREDIENT | WEIGHT % OF MASTERBATCH (TERRACOTTA) |
|---|---|
| YELLOW 42 | 21.5 |
| BROWN 130M | 15.5 |
| F95025 | 1.3 |
| CALCIUM OXIDE | 5 |
| CA STEARATE | 2.5 |

-continued

| INGREDIENT | WEIGHT % OF MASTERBATCH (TERRACOTTA) |
|---|---|
| PE WAX (1) | 5 |
| WAX (2) | 5 |
| WAX (3) | 2.5 |
| ACRYLIC 20 [P] | 13.3 |
| CHLORINATED POLYETHYLENE (CPE) | 27.4 |
| OIL | 1 |

Example 7

| INGREDIENT | WEIGHT % OF MASTERBATCH (CARAMEL) |
|---|---|
| YELLOW DYE 93 | 12.9 |
| BROWN 110M | 19.78 |
| BLK 7 N220 | 0.88 |
| BARYTES | 0 |
| CALCIUM OXIDE | 5 |
| CA STEARATE | 4 |
| WAX OP | 2.5 |
| ACRYLIC 20 [P] | 18 |
| CHLORINATED POLYETHYLENE (CPE) | 35.19 |
| WAX OA2/H12 | 1.75 |

Example 8

| INGREDIENT | WEIGHT % OF MASTERBATCH (CREAM) |
|---|---|
| BROWN 24 | 13.87 |
| YELLOW 119 | 2.63 |
| CHALK | 28 |
| CALCIUM OXIDE | 5 |
| CA STEARATE | 2.5 |
| PE WAX | 2.5 |
| WAX 10DS | 5 |
| WAX PN.909 | 2.5 |
| WAX OA2/H12 | 2 |
| ACRYLIC 20 [P] | 11 |
| CHLORINATED POLYETHYLENE (CPE) | 24 |
| OIL | 1 |

Example 9

| INGREDIENT | WEIGHT % OF MASTERBATCH (BRONZE) |
|---|---|
| PL 520 ECO | 27.5 |
| ORANGE DYE 60 | 4.5 |
| RED DYE 135 | 3.5 |
| BLK 7 N220 | 1.5 |
| CALCIUM OXIDE | 5 |
| CA STEARATE | 5 |
| WAX 10DS | 4 |
| WAX 295 | 2.5 |
| PARALOID C303H | 15.17 |
| PARALOID P270 | 4.33 |
| CHLORINATED POLYETHYLENE (CPE) | 22 |
| EBA [G] | 4 |
| OIL | 1 |

Example 10

| INGREDIENT | WEIGHT % OF MASTERBATCH (BLUE) |
|---|---|
| BLUE 15.1 ECO | 25 |
| BARYTES | 17 |
| CALCIUM OXIDE | 5 |
| CA STEARATE | 2.5 |
| PE WAX (1) | 5 |
| WAX (2) | 7.5 |
| WAX (3) | 2 |
| ACRYLIC 20 [P] | 11 |
| CHLORINATED POLYETHYLENE (CPE) | 24 |
| OIL | 1 |

Example 11

| INGREDIENT | WEIGHT % OF MASTERBATCH (COFFEE) |
|---|---|
| YELLOW 110 | 6.05 |
| BROWN 23 | 2.9 |
| BLK 7 N220 | 1.05 |
| BARYTES | 40 |
| CALCIUM OXIDE | 4 |
| CA STEARATE | 2 |
| PE WAX (1) | 2 |
| WAX (2) | 4 |
| WAX (3) | 2 |
| ACRYLIC 20 [P] | 11 |
| CHLORINATED POLYETHYLENE (CPE) | 24 |
| OIL | 1 |

Example 12

| INGREDIENT | WEIGHT % OF MASTERBATCH (BLACK) |
|---|---|
| BLK 7 SRF | 40 |
| CALCIUM OXIDE | 5 |
| PE WAX (1) | 7.5 |
| WAX (2) | 5 |
| WAX (3) | 2.5 |
| ACRYLIC 20 [P] | 8.35 |
| CHLORINATED POLYETHYLENE (CPE) | 29.65 |
| OIL | 2 |

Example 13

| INGREDIENT | WEIGHT % OF MASTERBATCH (BLACK) |
|---|---|
| BLK DYE X70 | 20 |
| BARYTES | 15.2 |
| CALCIUM OXIDE | 5 |
| CA STEARATE | 5 |
| WAX OP | 4 |
| WAX PN.909 | 2 |
| ACRYLIC 20 [P] | 22.5 |
| CHLORINATED POLYETHYLENE (CPE) | 26 |
| OIL | 3 |

Example 14

| INGREDIENT | WEIGHT % OF MASTERBATCH (BLACK) |
|---|---|
| BLK 7 N220 ECO | 23 |
| CALCIUM OXIDE | 5 |
| PE WAX (1) | 2.5 |
| WAX (2) | 6.5 |
| WAX (3) | 2.5 |
| ACRYLIC 20 [P] | 24 |
| CHLORINATED POLYETHYLENE (CPE) | 35 |
| OIL | 2.5 |

Example 15

| INGREDIENT | WEIGHT % OF MASTERBATCH (BLACK) |
|---|---|
| BLK 7 N220 | 15 |
| BARYTES | 27.5 |
| CALCIUM OXIDE | 5 |
| CA STEARATE | 5 |
| PE WAX (1) | 5 |
| WAX (2) | 2.5 |
| WAX (3) | 3 |
| ACRYLIC 20 [P] | 11 |
| CHLORINATED POLYETHYLENE (CPE) | 24 |
| OIL | 2 |

Example 16

| INGREDIENT | WEIGHT % OF MASTERBATCH (VIOLET) |
|---|---|
| VIOLET U/M 11 | 25 |
| BLUE U/M 08 | 1 |
| CALCIUM OXIDE | 5 |
| CA STEARATE | 5 |
| PE WAX (1) | 2 |
| WAX (2) | 2 |
| WAX (3) | 1 |
| ACRYLIC 20 [P] | 17 |
| CHLORINATED POLYETHYLENE (CPE) | 32 |
| OIL | 1 |

Example 17

| INGREDIENT | WEIGHT % OF MASTERBATCH (ORANGE) |
|---|---|
| ORANGE DYE 60 | 25 |
| BARYTES | 15 |
| CALCIUM OXIDE | 5 |
| WAX OP | 4 |
| CA STEARATE | 4 |
| WAX PN.909 | 2 |
| PARALOID C303H | 10 |
| PARALOID D320 | 10 |
| CHLORINATED POLYETHYLENE (CPE) | 20 |
| EBA [G] | 4 |
| OIL | 1 |

Example 18

| INGREDIENT | WEIGHT % OF MASTERBATCH (RED) |
|---|---|
| TIO2 COMMODITY | 5.5 |
| RED DYE 135 | 18 |
| BROWN 110M | 3 |
| RED 57.1 | 1.5 |
| CHALK | 18.4622 |
| CALCIUM OXIDE | 5.0378 |
| CA STEARATE | 5 |
| WAX OP | 4 |
| WAX OA2/H12 | 2.5 |
| ACRYLIC 20 [P] | 16 |
| CHLORINATED POLYETHYLENE (CPE) | 20 |
| OIL | 1 |

Example 19

| INGREDIENT | WEIGHT % OF MASTERBATCH (RED) |
|---|---|
| RED 53.1 | 19.8 |
| RED 57.1 | 2.7 |
| BROWN 110M | 2.7 |
| F95404 | 0.09 |
| BARYTES | 15 |
| CALCIUM OXIDE | 4 |
| CA STEARATE | 2 |
| PE WAX | 5 |
| WAX 10DS | 4 |
| WAX OA2/H12 | 2 |
| ACRYLIC 20 [P] | 13.11 |
| CHLORINATED POLYETHYLENE (CPE) | 28.6 |
| OIL | 1 |

It will be appreciated that in order to produce a PVC masterbatch carrier the at least one dye, pigment, and/or functional additive are removed from the above compositions and are subsequently added during masterbatch production.

Aspects of the present invention enable production of prill on a large scale not previously possible with known masterbatch compositions.

The aspects of the present invention have been described by way of example only and it will be appreciated to the skilled addressee that modifications and variations may be made without departing from the scope of protection afforded by the appended claims.

The invention claimed is:

1. A polyvinylchloride (PVC) prill masterbatch, the PVC prill masterbatch comprising:
    a chlorinated polyolefin having a melt flow index (MFI) characteristic of between 1 and 30 having units of g/10 min at a temperature of 180° C. at a weight of 10 kg;
    an acrylic processing aid and/or acrylic impact modifier and/or acrylic moulding powder; and
    at least one dye, pigment and/or functional additive.

2. The prill masterbatch according to claim 1, wherein the MFI characteristic is between 5 and 20.

3. The prill masterbatch according to claim 1, further comprising one or more processing additives.

4. The prill masterbatch according to claim 3, wherein the one or more processing additives are selected from the group consisting of a desiccant and a lubricant.

5. The prill masterbatch according to claim 4, comprising a lubricant comprising a blend of a plurality of lubricant materials.

6. The prill masterbatch according to claim 5, wherein the lubricant comprises one or more of one or more waxes and/or calcium stearate.

7. The prill masterbatch according to claim 3, wherein the one or more processing additive comprises oil.

8. The prill masterbatch according to claim 1, wherein the chlorinated polyolefin is present in an amount of between 10 and 40 weight percent of the prill masterbatch.

9. The prill masterbatch according to claim 1, wherein the prill masterbatch further comprises a filler.

10. A polyvinylchloride (PVC) prill masterbatch carrier comprising:
 a chlorinated polyolefin having a melt flow index (MFI) characteristic of between 1 and 30 having units of g/10 min at a temperature of 180° C. at a weight of 10 kg; and
 an acrylic processing aid and/or acrylic impact modifier and/or acrylic moulding powder.

11. A method of manufacturing a prill masterbatch, comprising the steps of:
 blending a chlorinated polyolefin having a melt flow index (MFI) characteristic of between 1 and 30 having units of g/10 min at a temperature of 180° C. at a weight of 10 kg and an acrylic processing aid and/or acrylic impact modifier and/or acrylic moulding powder and at least one dye, pigment and/or functional additive to form a blend; and
 forming the blend into a shaped body comprising the prill masterbatch.

12. The prill masterbatch according to claim 1, wherein a diameter of the prill masterbatch is from 1.2 mm to 2 mm.

13. The method of claim 11, wherein the forming the blend into the shaped body comprises:
 passing the blend through a die hole so as to form a cylindrical portion;
 detaching the cylindrical portion so as to form a detached cylindrical portion having a generally cylindrical shape; and
 allowing the detached cylindrical portion to cool, thereby changing the generally cylindrical shape to a generally spherical shape.

14. The method of claim 13, wherein the generally spherical shape has a diameter of from 1.2 mm to 2 mm.

15. The method of claim 13, wherein the die hole has a diameter from 1.2 mm to 2.6 mm.

16. The method of claim 13, wherein the die hole has a diameter of from 1.2 mm to 1.8 mm.

17. The method of claim 11, wherein the chlorinated polyolefin is present in an amount of between 10 and 40 weight percent of the prill masterbatch.

18. The method of claim 11, wherein the chlorinated polyolefin is present in an amount of between 15 and 36 weight percent of the prill masterbatch.

19. The method of claim 11, wherein the chlorinated polyolefin is present in an amount of between 17 and 34 weight percent of the prill masterbatch.

20. The prill masterbatch of claim 1, wherein the chlorinated polyolefin is present in an amount of between 15 and 36 weight percent of the prill masterbatch.

* * * * *